United States Patent [19]

Goebel

[11] 4,255,082
[45] Mar. 10, 1981

[54] ASPIRATING SYSTEM FOR THE COMPRESSOR OF A GAS TURBINE

[75] Inventor: Konrad Goebel, Erlangen, Fed. Rep. of Germany

[73] Assignee: Kraftwerk Union Aktiengesellschaft, Mülheim, Fed. Rep. of Germany

[21] Appl. No.: 930,562

[22] Filed: Aug. 3, 1978

[30] Foreign Application Priority Data

Aug. 10, 1977 [DE] Fed. Rep. of Germany ....... 2736074

[51] Int. Cl.³ .............................................. F04D 29/40
[52] U.S. Cl. .................................. 415/182; 415/219 R
[58] Field of Search ......................... 415/182, 219 R; 137/15.1; 417/408, 409; 209/52

[56] References Cited

U.S. PATENT DOCUMENTS

| | | | |
|---|---|---|---|
| 2,459,935 | 1/1949 | Halford | 417/409 |
| 2,557,101 | 6/1951 | Mayer | 417/408 |
| 2,646,211 | 7/1953 | Isabella | 415/219 R |
| 3,489,377 | 1/1970 | Pearson et al. | 137/15.1 X |
| 3,986,790 | 10/1976 | Yamaguchi et al. | 415/182 |
| 4,002,023 | 1/1977 | Hartmann | 290/52 X |

FOREIGN PATENT DOCUMENTS 372721  3/1923  Fed. Rep. of Germany .......... 417/409

Primary Examiner—Leonard E. Smith
Attorney, Agent, or Firm—Herbert L. Lerner

[57] ABSTRACT

Aspirating system for the compressor of a gas turbine disposed next to a power-producing plant on the same shaft. The system has two separated suction canals extending laterally next to the powder producing plant. A transition part conveys the air from the suction canals to an axial intake opening in the compressor. The transition part has an inner shell of a truncated cone and outer shell of the truncated cone and two vertical baffles inclined toward each other, disposed between the inner shell and outer cone shell with the baffles touching each other in front of the intake opening of the compressor and terminating there. A transfer canal part adapts the cross section of each such canal facing the transition part to the entrance cross section of the transition part.

4 Claims, 9 Drawing Figures

ASPIRATING SYSTEM FOR THE COMPRESSOR OF A GAS TURBINE

BACKGROUND OF THE INVENTION

1. Field of the Invention

This invention relates to an aspirating system or a suction system for the compressor of a gas turbine disposed on the same shaft next to a power-producing machine, with suction canals which extend next to the power-producing machine and are connected to the intake opening, of the compressor.

2. Description of the Prior Art

The German Petty Patent No. 7 417 306, describes a power-producing machine which is surrounded by a hollow-cylindrical annular space. The intake air flows vertically from above via a sound absorber and filter into this hollow space, where it is deflected 90° in the direction toward the turbine axis and is conducted to the intake cross section of the compressor via a hollow cone-shaped transition part. In addition to the necessary deflection of the gases in the intake canal by 90° which is undesirable, there is an impediment in the flow in the canal portion below the generator foundation due to the foundation supports required there on the compressor side.

SUMMARY OF THE INVENTION

An object of the invention is to provide an aspirating system which largely avoids abrupt changes or instabilities in the air flow, such as occur due to deflections and to abrupt or discontinuous cross section changes, without the need to arrange the power-producing machine at the exhaust gas end of the turbine.

With the foregoing and other objects in view, there is provided in accordance with the invention an aspirating system for a compressor of a gas turbine disposed on the same shaft next to a power-producing machine which includes (a) two suction canals separated from each other extending laterally next to the power-producing machine, (b) an axial intake opening of hollow-cylindrical cross section in the compressor for the intake of air, (c) a transition part having an inner shell of a truncated cone and an outer shell of the truncated cone leading toward the shaft and connected with the axial intake opening of hollow-cylindrical cross section of the compressor for flow of air from the two suction canals to the axial intake of the compressor, (d) two baffles in a vertical plane approaching each other in the direction of flow of air, disposed between the inner cone shell and outer cone shell of the transition part, with the baffles touching each other in front of the intake opening of the compressor and terminating there, and (e) the cross section of each suction canal adapted on the side facing the transition part, to the entrance cross section of the transition part defined by the inner and outer cone shells and the vertical baffle.

Other features which are considered as characteristic for the invention are set forth in the appended claims.

Although the invention is illustrated and described herein as embodied in aspirating system for the compressor of a gas turbine, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which.

In accordance with the invention, two suction canals or ducts are separated from each other and extend only laterally to the work-performing machine. The transition part has an inner shell of a truncated cone and an outer shell of the truncated cone. Baffles with a vertical sheet plane are arranged between the inner cone shell and the outer cone shell of the transition part. The baffles approach each other in the flow direction of the air and touch each other in front of the inlet opening of the compressor and end there. The cross section of each suction canal, at least on the side facing the transition part is adapted to the entrance cross section of the transition part, which is defined by the inner and the outer cone shell and the vertical baffle.

Figure 1:
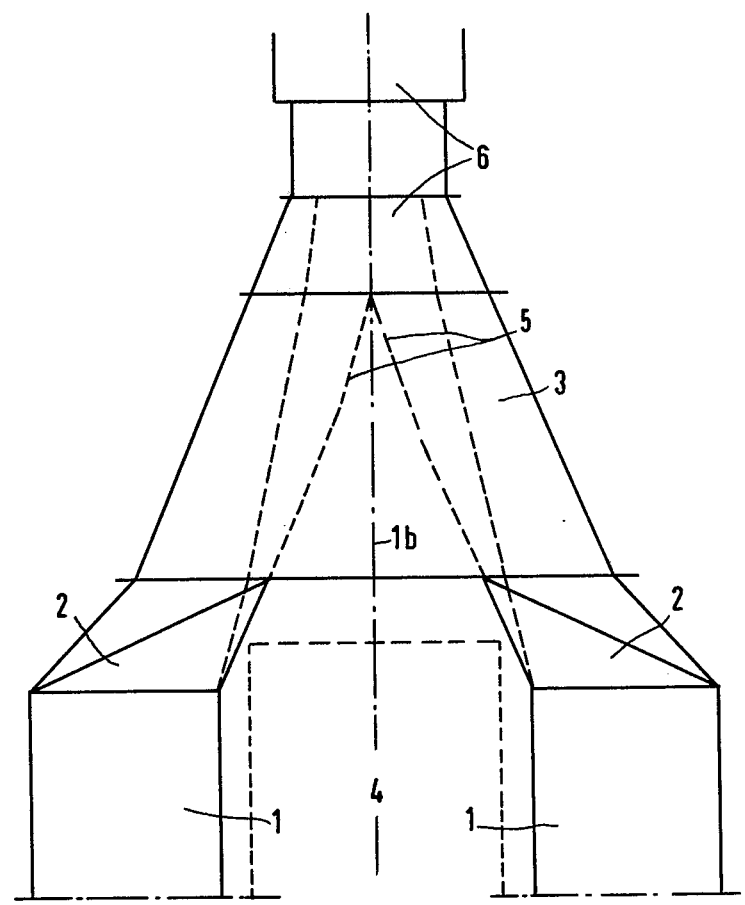
FIG. 1 diagrammatically illustrates a top view of the aspirating system for a power-producing machine and compressor arranged on a common shaft in accordance with the invention.
Figure 2:
FIG. 2 shows the rectangular cross section of the two suction canals shown in FIG. 1, FIGS. 3, 4 and 5 are top, front and side views, respectively, of the transition part shown in FIG. 1.
Figure 3:
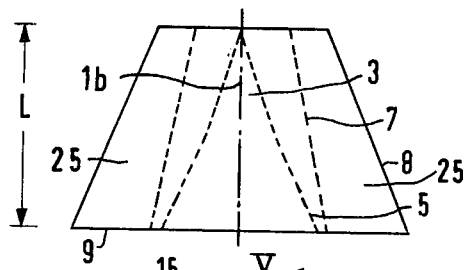
Figure 4:
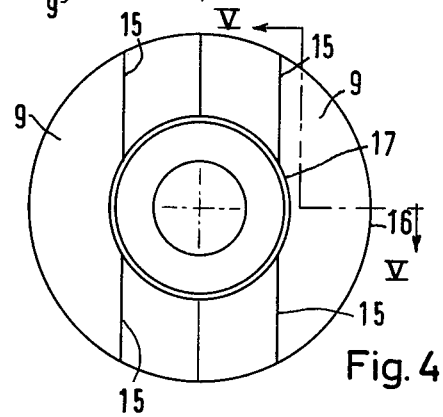
Figure 5:
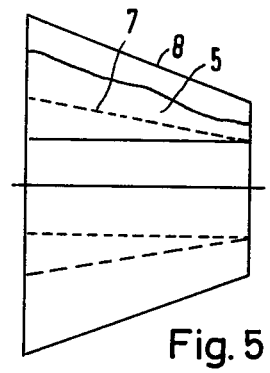

Referring to the drawings, an embodiment example is shown diagrammatically in FIG. 1. FIG. 2 shows the flow cross section of the suction canals according to FIG. 1. In FIGS. 3 to 5, a transition part is shown in three views. In FIGS. 6 to 9, a transfer canal for adapting the cross sections of the suction canals to the inlet cross section of the transition part is shown.

In FIG. 1, a power-producing machine 4 and the compressor 6 of a gas turbine, not shown in detail, are arranged on a common shaft next to each other. The axis of the shaft is designated 1b. At the height and to both sides of the shaft axis 1b there are two suction canals 1 of rectangular cross section 1a. The suction canals 1 extend parallel to the shaft axis 1b. There is no connection between the gas flow or suction channel of the gas turbine with the generator or power producing machine. At the lower end, they can be connected, for instance, to the exit of a sound absorber, not shown, as well as to an air filter. Adjoining the upper ends of the suction canals 1 is a transfer canal part 2, which adapts the cross section of the two suction canals 1 to the inlet of a transition part 3. The transition part 3 has a hollow-cylindrical exit cross section and is mounted directly on the intake opening of the compressor 6.

In the transition part 3, the half-streams of the gas from the suction canals 1 are combined without abrupt or discontinuous changes in cross section occurring.

This transition part is shown in detail in FIGS. 3, 4 and 5. It consists of three structural parts:

The inner cone shell 7, through which the shaft with the shaft axis 1b for connecting the power-producing machine 4 with the compressor 6 is brought;

the outer cone shell 8 with an angle of inclination to the turbo axis of less than 30°; and the baffles 5, which connect the two cone shells 7 and 8 in the vertical plane. The entrance edges 15 of the baffles as well as the line at which both baffles abut are visible in FIG. 4.

The cone shells 7 and 8 enclose a hollow cone-shaped cross section, which is divided by the baffles 5 into two canal halves 25 with the cross-sectional contours shown in FIG. 4. The cross-sectional contours consist of the entrance edges 15 of the vertical baffles 5, the pitch circle 17 of the inner cone shell 7 an the pitch circle 16 of the outer cone shell 8.

The baffles 5 are curved only in one dimension. The curvature of the baffles 5 is chosen so that the cross sections of the canal halves 25, starting at the entrance cross section 9 of the transition part 3, get steadily smaller in the direction toward the exit cross section. This imparts to the mass flow of the flowing gas an at least constant, but preferably increasing acceleration, without a sudden velocity change occurring.

Figure 6:
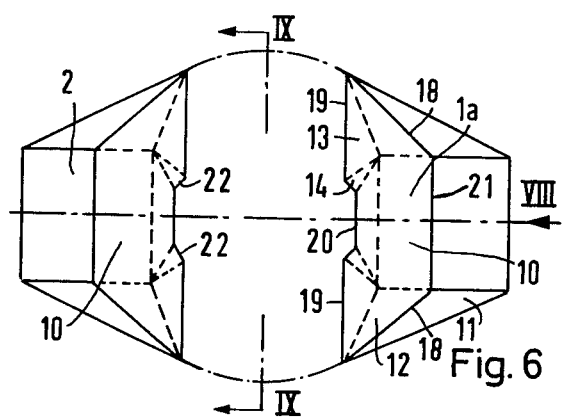
FIG. 6 is an elevation of the transfer canal part for adapting the cross sections of the suction canals to the entrance cross section of the transition part.
Figure 8:
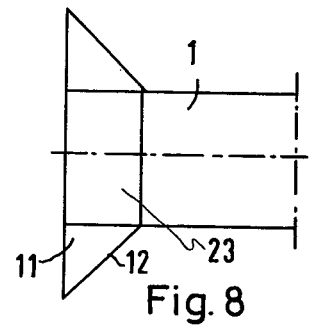
FIG. 8 is a view of the transfer canal part in the direction of the arrow VIII of FIG. 6.
Figure 7:
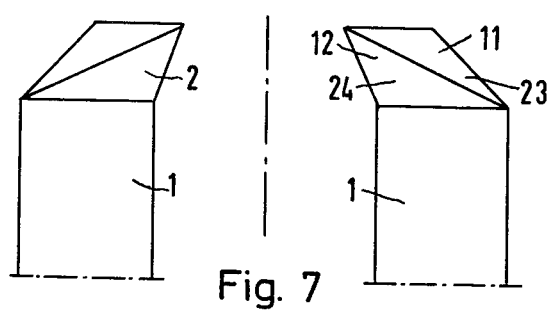
FIG. 7 is a top view of the transfer canal part.
Figure 9:
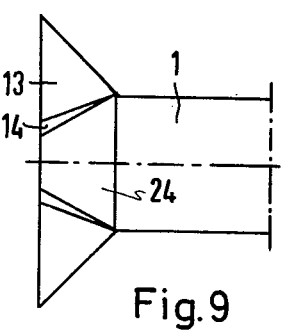
FIG. 9 is a view of the transfer canal part taken along line IX—IX of FIG. 6.

A transfer canal part 2, which is shown as an elevation in FIG. 6 and in a top view in FIG. 7, is arranged between the suction canals 1 and the transition part 3 for adapting the cross sections of the suction canals 1 to the entrance cross section 9 of the transition part 3.

FIG. 6 shows the shape of the exit cross section 10 of the transfer canal part 2 which adjoins the entrance cross section 9 of the transition part 3. The size of the cross sections is chosen so that the cross section 1a of both suction canals 1 is equal to or larger than the exit cross sections 10 of the transfer canal parts 2. This prevents a sudden reduction of the velocity of the mass flow in the region of the transfer canal part 2. The exit cross section 10 of the transfer canal part 2 is formed by the outline contours 18, 19, 20, 21 and 22.

These outline contours are connected to the cross section 1a of the suction canals 1 by plane triangle areas 11, 12, 13 and 14. The triangle area 12 connects to the ceiling and the bottom of the suction canal 1. The triangle area 11 (FIG. 8) adjoins the outside wall 23 of the canal, angled off at the top and bottom.

The triangle areas 13 and 14 provide the transition of the inside canal wall 24 (FIGS. 7 and 9), which are likewise angled off, to the outline contours 19 and 22 of the exit cross section 10.

Figure 10:
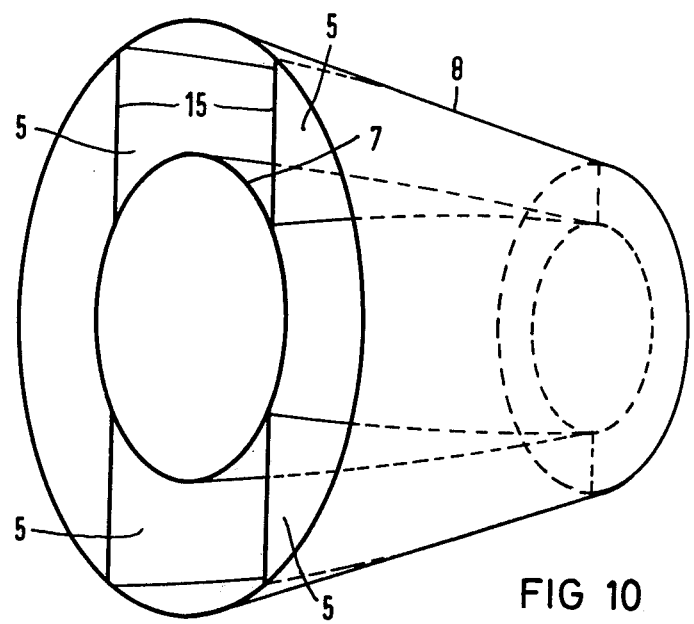
FIG. 10 is a perspective view of the transition part.
Figure 11:
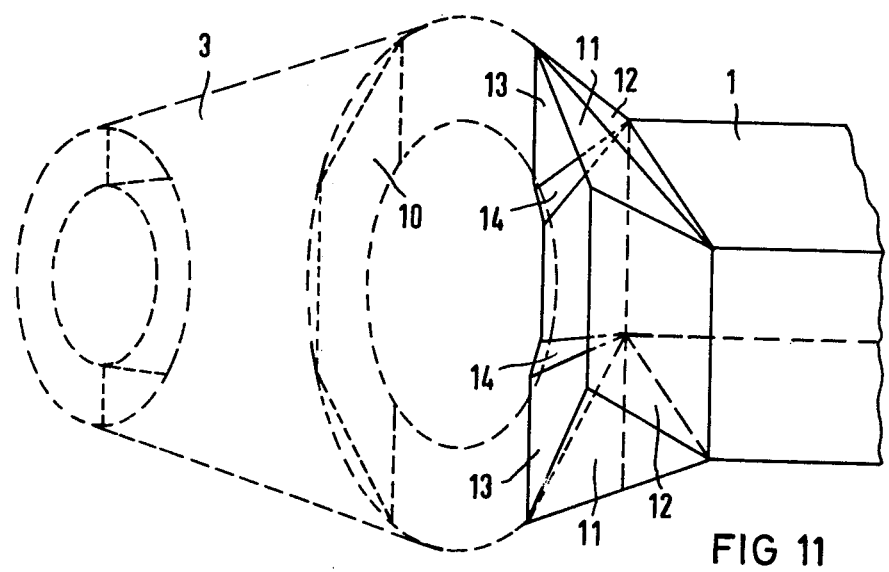
FIG. 11 is a perspective view of the transition part in broken lines and in addition shows in perspective view, the suction canal and the transfer canal part.

In FIGS. 10 and 11 may readily be seen the location of baffles 5 as well as illustrating the shape of transfer canal 2. Both baffles 5 are located between the inner cone frustum 7 and the outer cone frustum 8.

By the described design of the suction system, discontinuous or abrupt velocity changes and right-angle deflections of the flowing air are thereby avoided. One therefore obtains a particularly uniform potential flow at the entrance of the compressor 6, so that compressors with transonic blades can be used without difficulty, which blades are particularly sensitive to an uneven velocity distribution of the gases before they enter the first compressor stage.

There is claimed:

1. Aspirating system for a compressor of a gas turbine disposed on the same shaft next to a power-producing machine which comprises
    (a) two suction canals separated from each other extending laterally next to the power-producing machine,
    (b) an axial intake opening of hollow-cylindrical cross section in the compressor for the intake of air,
    (c) a transition part having an inner shell of a truncated cone and an outer shell of the truncated cone leading toward the shaft and connected with the axial intake opening of hollow-cylindrical cross section of the compressor for flow of air from the two suction canals to the axial intake of the compressor,
    (d) two baffles in a vertical plane approaching each other in the direction of flow of air, disposed between the inner cone shell and outer cone shell of the transition part, with the baffles touching each other in front of the intake opening of the compressor and terminating there, and
    (e) the cross section of each said suction canal adapted on the side facing the transition part, to the entrance cross section of the transition part defined by the inner and outer cone shells and the vertical baffle.

2. Aspirating system according to claim 1, wherein the baffles are curved so that a steadily decreasing cross section is provided in the flow direction in the region of the transition part.

3. Aspirating system according to claim 1, wherein the suction canals each have a rectangular cross section and a transfer canal part disposed between the suction canals and the transition canal part for adapting the cross section of each suction canal.

4. Aspirating system according to claim 3, wherein the transfer canal part is welded together from sheet metal parts which have plane triangular areas.

* * * * *